United States Patent [19]

Fry et al.

[11] Patent Number: 5,445,738
[45] Date of Patent: Aug. 29, 1995

[54] VIBRATING FILTER

[76] Inventors: Darrel D. Fry, 203 S. Mississippi, Nowata, Nowata County, Okla. 74048; William R. Wells, 4261 E. 102 S., Tulsa, Tulsa County, Okla. 74137; Malcolm R. McDonald, 5303 S. Louisville, Tulsa, Tulsa County, Okla. 74135

[21] Appl. No.: 108,246

[22] Filed: Aug. 19, 1993

[51] Int. Cl.6 .............................................. B01D 33/03
[52] U.S. Cl. ................................ 210/384; 210/323.2; 210/388
[58] Field of Search ...................... 210/384, 323.2, 388

[56] References Cited

U.S. PATENT DOCUMENTS

| | | | |
|---|---|---|---|
| 2,167,236 | 7/1939 | Gieseler | 55/304 |
| 3,161,591 | 12/1964 | Petter et al. | 210/251 |
| 3,212,643 | 10/1965 | Schmidt, Jr. et al. | 210/388 |
| 3,386,699 | 6/1968 | Petter et al. | 251/315.7 |
| 3,387,712 | 6/1968 | Schrink | 210/411 |
| 3,692,178 | 9/1972 | Reece | 210/798 |
| 3,703,465 | 11/1972 | Reece et al. | 210/333.1 |
| 3,747,765 | 7/1973 | Nowak | 210/238 |
| 3,870,640 | 3/1975 | Reece | 210/388 |
| 3,970,552 | 7/1976 | Bongert | 210/388 |
| 3,976,577 | 8/1976 | Kaiser | 210/333.01 |
| 4,094,784 | 6/1978 | Hirano | 210/384 |
| 4,456,061 | 6/1984 | Swift | 166/75.1 |
| 4,741,841 | 5/1988 | Barre et al. | 210/323.2 |
| 4,804,481 | 2/1989 | Lennartz | 139/351 |
| 4,836,922 | 6/1989 | Rishel et al. | 210/388 |
| 5,084,176 | 1/1992 | Davis et al. | 210/350 |
| 5,087,365 | 2/1992 | Davis et al. | 210/388 |
| 5,167,801 | 12/1992 | Kawasaki | 210/225 |
| 5,176,826 | 1/1993 | Rosaen | 210/232 |

FOREIGN PATENT DOCUMENTS

| | | | |
|---|---|---|---|
| 2457843 | 6/1976 | Germany | 210/384 |
| 210213 | 6/1984 | Germany | |
| 1386241 | 4/1988 | U.S.S.R. | 210/384 |
| 1456187 | 2/1989 | U.S.S.R. | 210/384 |
| 1461500 | 2/1989 | U.S.S.R. | 210/384 |
| 1611388 | 12/1990 | U.S.S.R. | 210/384 |

*Primary Examiner*—Virginia Manoharan
*Attorney, Agent, or Firm*—Shook, Hardy & Bacon

[57] ABSTRACT

A vibrating filter has a housing, a separation member, a filter, and a vibrator. The housing defines an outlet chamber and a filter chamber, and the separation member secures within the housing to separate the outlet chamber and the filter chamber. The filter secures within the filter chamber. The filter has an outlet matable with at least one hole in the separation member so that the filter is in fluid communication with the outlet chamber. The vibrator rigidly secures solely to the separation member for vibrating the separation member, thereby vibrating the filter. The vibrating filter also preferably has a cover for the outlet chamber and a vibration isolating structure secured between the separation member and the cover for dampening vibration to the cover which is imparted to the separation member by the vibrator.

15 Claims, 2 Drawing Sheets

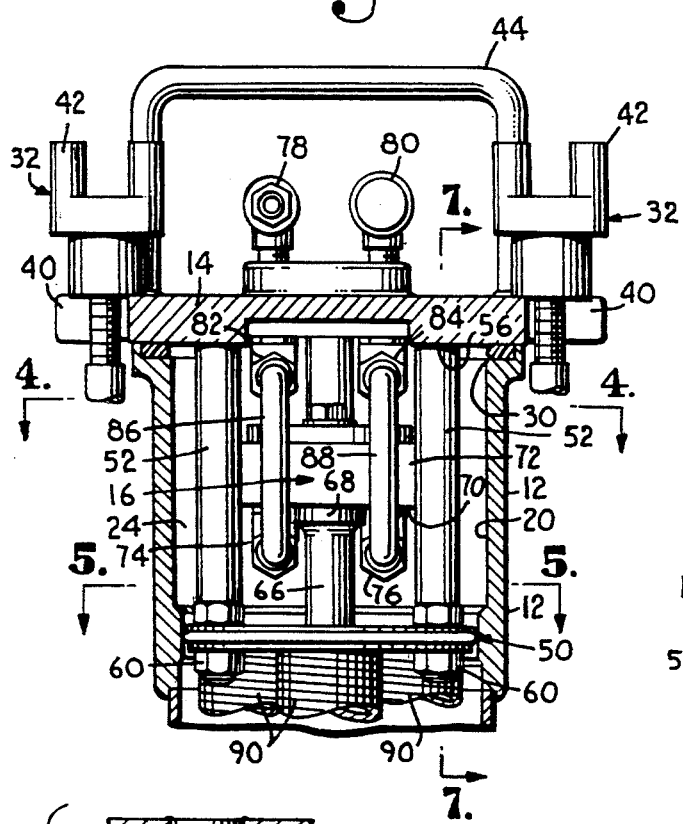
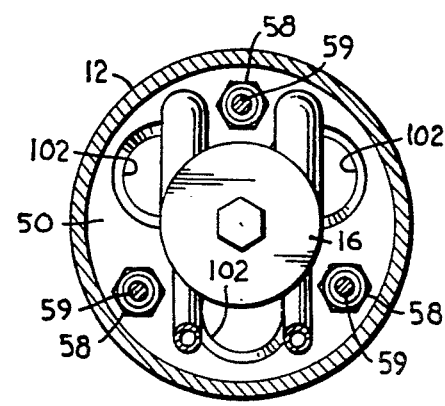
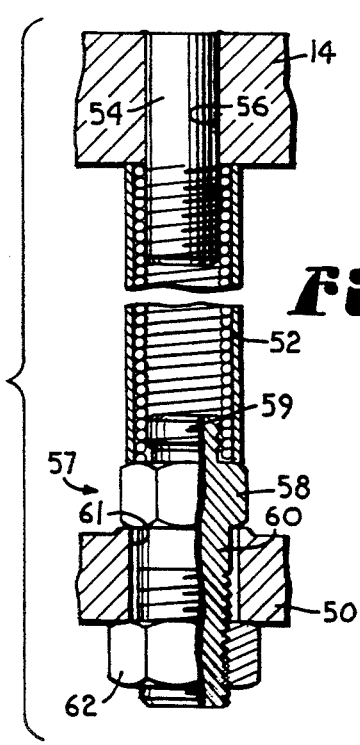
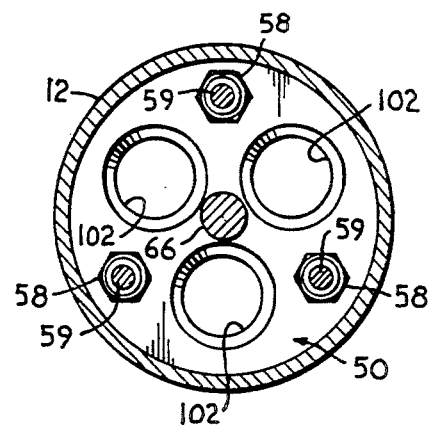

VIBRATING FILTER

FIELD OF THE INVENTION

This invention relates to a vibrating filter, and more particularly, to a vibrating filter for removing impurities from liquids, such as paint.

BACKGROUND OF THE INVENTION

Industrial vibrating filters for filtering impurities from liquids, such as paint, are well known in the art. Such vibrating filters are connectible within a liquid system and intake a processing liquid in an inlet, filter the liquid, and output the filtered liquid through an outlet for the desired application such as painting. The prior art vibrating filters generally comprise a filter element within a filter chamber and a vibrator secured within the inlet or outlet chamber. The vibrator typically comprises a housing, a ball located within the housing, and an air or gas source for causing the ball to orbit rapidly within the housing to vibrate the housing. The vibration of the vibrator is imparted to the vibrating filter housing, and, thus, to the filter element, which allows impurities in the liquid to be filtered more effectively.

A significant problem associated with prior art vibrating filters is that the vibrator vibrates the entire device, as opposed to only vibrating the filter element. This problem is significant for several reasons. To impart a desired level of vibration to the filter element, more energy is required to deliver the desired level of vibration to the filter element when the entire unit is vibrated, in contrast to vibrating only the filter element. Thus, more compressed air or gas must be supplied to the vibrator to provide the increased vibration necessary to vibrate the filter element at the desired level when the entire unit is being vibrated. Further, a larger vibrator unit is also required to deliver the increased vibration necessary to vibrate the entire device. For this reason, prior art vibrating filters use vibrators which are unnecessarily large. Moreover, it is undesirable to vibrate the entire device because the device is more difficult to handle, makes more noise and is subject to higher maintenance costs.

Another problem associated with prior art vibrating filters is that a seal is required between the filter chamber and the outlet chamber. The prior art seals have allowed impurities in the filter chamber to undesirably circumvent the seal and enter the outlet chamber. With respect to industrial painting applications, such ineffective seals cause impurities to mar the painted surface, thereby detracting from the appearance of the painted object.

SUMMARY OF THE INVENTION

It is therefore a primary object of the present invention to provide a vibrating filter which is more efficient by directly vibrating only the filter. Stated another way, an object is to provide such a vibrating filter which does not directly vibrate the cover or the housing of the vibrating filter. It should be understood that the cover and the housing of such a filter will indirectly realize some vibration, and, thus, a further object is to minimize the vibration imparted to the cover and the housing. And yet another object is to provide a vibrating filter which incorporates an improved sealing arrangement between the filter chamber and the outlet chamber to minimize impurities in the filtered liquid.

More specifically, an object is to secure the vibrator of the vibrating filter solely to the filter element so that only the filter is directly vibrated. A further object is to provide a vibration isolation structure between the filter element and the cover of the vibrating filter to minimize vibration imparted to the cover and the housing of the vibrating filter.

A related object is to provide a vibrating filter which requires less energy to impart a desired level of vibration to the filter in the filter chamber. More specifically, an object is to provide such a vibrating filter which requires less air or gas to activate the vibrator of the filter, and which also requires a smaller vibrator to produce the desired level of vibration. Thus, an object is to disclose a vibrating filter which is lighter and easier to handle than prior vibrating filters which impart equivalent vibration to the filter. More specifically, an object is to secure the vibrator directly to the filter element so that all vibrational energy is imparted to the filter element, thus allowing minimum energy to produce the desired level of vibration.

To accomplish these and other related objects of the invention, a vibrating filter for filtering impurities from liquids is disclosed which generally comprises a housing, a separation member, a filter, and a vibrator. The housing defines an outlet chamber and a filter chamber, and the separation member secures within the housing to separate the outlet chamber and the filter chamber. The filter is secured within the filter chamber, and is in fluid communication with the outlet chamber. The vibrator rigidly secures solely to the separation member for vibrating the separation member, thereby vibrating the filter.

In the preferred embodiment, the vibrating filter further comprises a cover for the outlet chamber and vibration isolating structure secured between the separation member and the cover for dampening vibration to the cover which is imparted to the separation member by the vibrator. The vibration isolating structure preferably comprises three springs secured between the separation member and the cover. The springs should be at least substantially compressed. The vibrator is preferably mounted within the outlet chamber so as to impart vibration in a plane generally orthogonal to the springs so that the substantially compressed springs more effectively dampen vibration to the cover and to the housing.

In another aspect of the invention, the vibrating filter further comprises an improved seal between the filter chamber and the outlet chamber. In this aspect, the vibrating filter further comprises a cover for removably securing to and closing an open top of the housing. The separation member fixedly secures to the cover in spaced apart relation such that the housing is separated into an outlet chamber formed between the cover and the separation member, and a filter chamber formed below the separation member when the cover is secured to the housing. The separation member is supported by the cover within the housing so that the separation member loosely abuts the inside wall of the housing. The separation member further comprises a bottom surface exposed to the filter chamber. A sealing member fixedly secures adjacent the bottom surface of the separation member for sealing the abutment of the separation member to the inside wall of the housing. The pressure differential between the filter chamber and the outlet chamber causes the sealing member to be forced against the abutment of the separation member to the housing wall, thereby sealing the abutment. The sealing member preferably comprises an O-ring.

Thus, it can be seen that the present invention overcomes the above-described problems of prior art vibrating filters. Because the vibrator is secured directly to the filter element, vibration is not directly being imparted to the entire device. Thus, the vibrating filter of the present invention requires less energy, and more specifically, less air and a smaller vibrator, to impart a desired level of vibration to the filter of the vibrating filter. Further, the vibration isolating structure dampens vibration which is indirectly realized by the cover and the housing of the vibrating filter. Moreover, the improved sealing arrangement between the filter chamber and the outlet chamber minimizes impurities in the filtered liquid.

BRIEF DESCRIPTION OF THE DRAWINGS

In the accompanying drawings which form a part of the specification and are to be read in conjunction therewith and in which like reference numerals are used to indicate like parts in the various views:

FIG. 3 is a fragmentary, enlarged side cross-sectional view taken generally along the plane of line 3—3 in FIG. 2 in the direction of the arrows, showing the vibrator secured within the outlet chamber;

FIG. 4 is a top cross-sectional view taken generally along the plane of line 4—4 in FIG. 3 in the direction of the arrows;

FIG. 5 is a top cross-sectional view taken generally along the plane of line 5—5 in FIG. 3 in the direction of the arrows;

FIG. 7 is a fragmentary, enlarged side cross sectional view taken generally along the plane of line 7—7 in FIG. 3 in the direction of the arrows, showing one of the springs comprising the vibration isolating structure secured to the separation member.

DETAILED DESCRIPTION OF THE PREFERRED EMBODIMENTS

Figure 1:
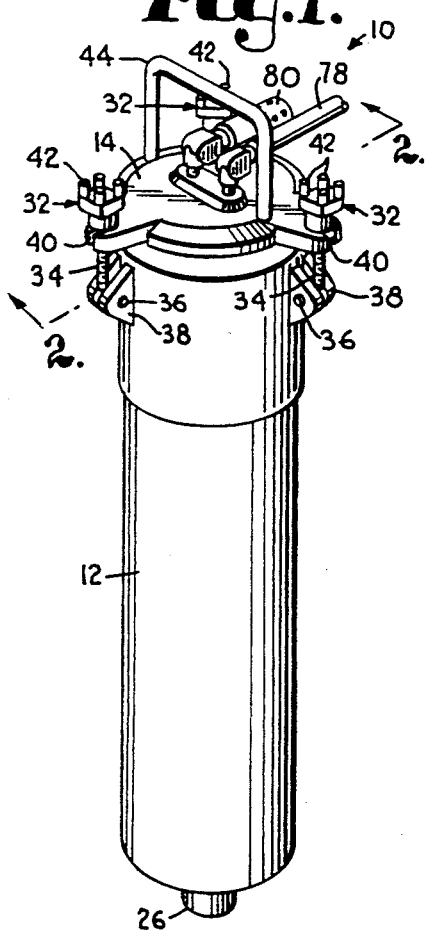
FIG. 1 is a perspective view of the vibrating filter in accordance with the present invention.

Referring now to the figures, a vibrating filter constructed according to a preferred embodiment of the present invention is designated generally 10. The vibrating filter 10 generally comprises a housing 12, a cover 14, a vibrator 16, and a filter 18. The housing has an inner wall 20 which defines a filter chamber 22 and an outlet chamber 24. The housing 12 further comprises an inlet 26 for receiving an unfiltered liquid, such as paint, into the filter chamber 22 and an outlet 28 formed in the outlet chamber 24 to output the filtered liquid from filter 18. The vibrating filter 10 also comprises an open top 30 which can be accessed by removing cover 14 to provide access to the inside of the vibrating filter.

The cover 14 is removably secured to the housing 12 to seal the open top 30 by known means, such as pivot toggles 32. Each pivot toggle 32 comprises an eyebolt 34 pivoted at its lower end by a horizontal pivot pin 36 in a boss 38 protruding sidewardly from the top portion of the housing 12. The upper end of eyebolt 34 is threaded and is pivotable upwardly into a slot 40 in the overhanging edge of the cover 14 to protrude upwardly therebeyond and threadedly receive a handle nut 42. Three pivot toggles 32 are preferably evenly circumferentially distributed on the housing 12. Tightening of the three handle nuts 42 downwardly onto the top of the cover 14 snugly secures the cover 14 downward against the upper end of the housing 12 to thereby securely seal the open top 30 of the outlet chamber 24. Loosening of the handle nut 42 for each pivot toggle 32 allows the eyebolt 34 to pivot radially outward about its pivot pin 36 and clear the slot 38. Doing so with each of the three pivot toggles 32 allows the cover 14 to be lifted from the housing 12 for access to the interior thereof. The cover 14 further comprises a handle 44 to facilitate placement on and removal from the housing 12.

A separation member 50 is secured to the cover 14 by a vibration isolating structure which preferably comprises three semirigid, fully compressed springs 52. Referring to FIG. 7, a stud 54 is secured within a receiving hole 56 of the cover 14 by known means, such as welding. There is a stud 54 corresponding to each spring 52. Each stud is secured to the bottom surface of the cover, as described above, at a first end and is threaded at a second end to be adapted to matingly thread into, and thus secure to, the top portion of each spring 52. Each spring 52 is thereby secured to the cover 14.

Referring to FIG. 7, the other side of each spring is secured to separation member 50 by a nut and stud assembly 57. Assembly 57 includes a nut 58 and oppositely extending stud portions 59 and 60 cast integrally therewith. Stud 60 is received within a hole 61 formed in the separation member and secures thereto, such as by being threaded to matingly receive nut 62. Stud 59 is also threaded to be matingly received by the compressed spring 52 (as described above for stud 54), thus fixedly securing spring 52 to assembly 57. It can therefore be seen that each spring 52 is secured between the cover 14 and the separation member 50 by a corresponding set of studs 54 and assemblies 57.

Figure 2:
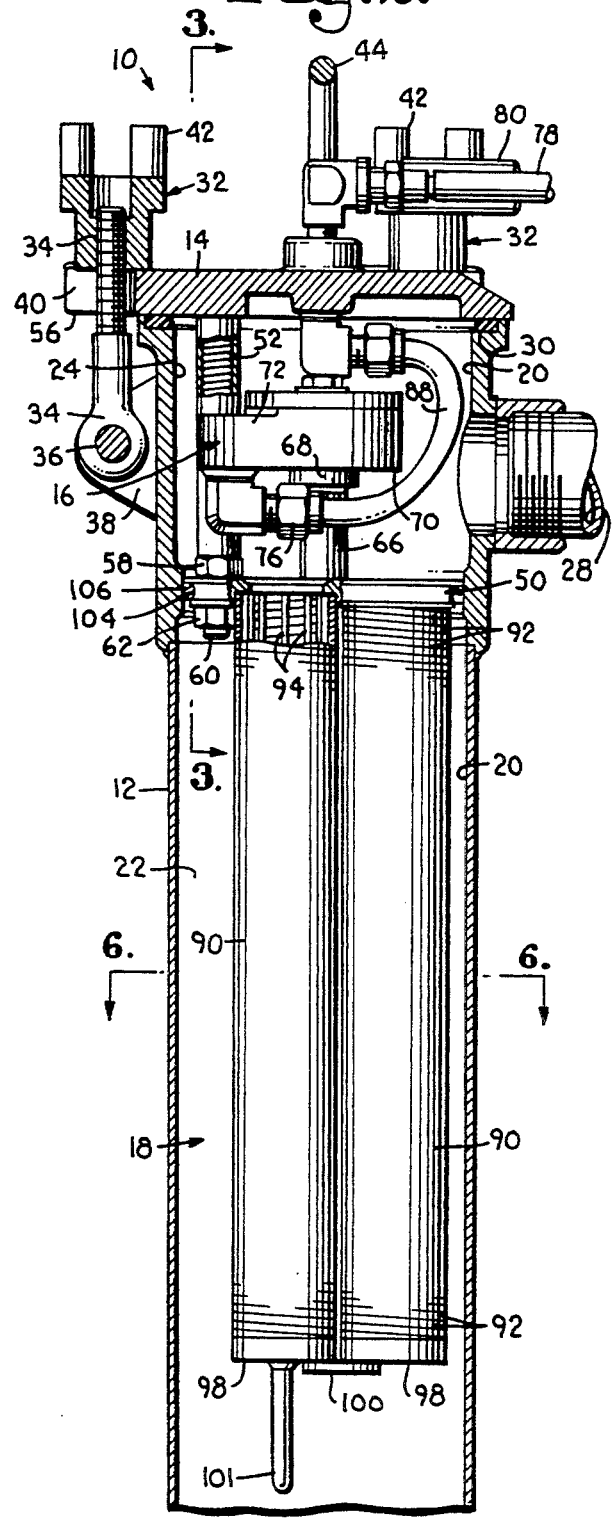
FIG. 2 is a fragmentary, enlarged side cross-sectional view taken generally along the plane of line 2—2 in FIG. 1 in the direction of the arrows, showing the internal structure of the vibrating filter.

Referring to FIG. 2, the vibrator 16 is secured to the separation member 50 by a rod 66. The rod 66 secures to the top surface of the separation member 50 by known means, such as by cast thereto. The rod 66 has an enlarged disk member 68 formed integrally therewith at its other end. The disk member 68 secures to the bottom surface 70 of the vibrator 16.

The vibrator 16 is mounted to provide vibration in a substantially horizontal plane. The vibrator 16 contains a ball within the housing 72 which, as mounted, is adapted to be vibrated in a substantially horizontal plane, as is well known in the art. Because the springs 52 are fully compressed in the vertical direction, imparting horizontal vibration to the filter allows the springs to move laterally to more effectively dampen the horizontal vibration imparted by the vibrator. The vibrator 16 further comprises fittings 74 and 76 for connecting to the air inlet 78 and air outlet 80, respectively. The air inlet 78 and air outlet 80 comprise fittings 82 and 84, respectively, which secure to the cover 14 by known means. The fittings 82 and 84 are coupled with air tubes 86 and 88, respectively. The air inlet 78 provides air to the vibrator 16 through air tube 86, and air tube 88 provides an outlet for the air supply to the vibrator 16. The air tube 88 outputs the air from the compressor through the air outlet 80. The air inlet 78 is adapted to connect to a compressed air or gas source for providing air to the vibrator 16 to thereby rapidly orbit the ball within the vibrator to cause vibration. The vibrator and its operation in conjunction with vibrating filters of the type disclosed herein is well known in the art.

Figure 6:
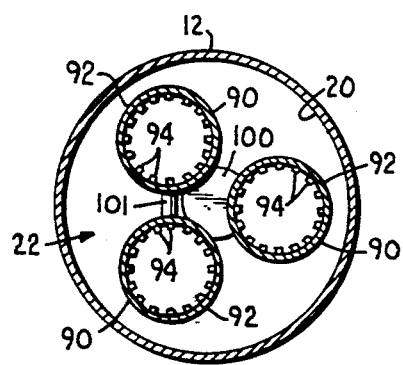
FIG. 6 is a top cross-sectional view taken generally along the plane of line 6—6 in FIG. 2 in the direction of the arrows.

The filter 18 comprises at least one upstanding filter element 90, and preferably comprises three filter elements 90, as shown in FIGS. 3 and 6. The filter elements 90 extend longitudinally within the filter chamber 22 and are circumferentially spaced around a common central access, such that the three filter elements 90 are at the apices of an equilateral triangle, as shown in FIG. 6. By providing more than one filter element 90, it is possible to increase the surface area available for filtering without increasing the overall diameter of the filter cartridge. The spacing of the three filter elements 90 from each other permits process liquid to move between the filter elements, and therefore allows all of the surfaces of the filter elements to carry out effective filtering. Such arrays of filter elements for vibrating filters is well known in the art, and will not be described further herein.

In the embodiment shown, the filter elements 90 are of the conventional kind wherein a square or trapezoidal cross-section metal rod 92 is wound in a circular manner around a plurality of upstanding, circumferentially spaced internal struts 94 and welded thereto to form a cylindrical, perforate filter element wall. The filter elements 90 are closed at the bottom ends as generally indicated at 98. A circular member 100 connects the bottoms of the three filter elements 90. A handle 101 is connected to two of the filter elements to allow the filter 18 to be stored upside down for cleaning purposes when the filter is removed from the housing 12.

The top of each filter element 90 is secured to the separation member 50. The separation member 50 is fixed to the open tops of the filter elements 90 in a manner to allow filtered liquid to flow up through the open tops of the filter elements 90 into the outlet chamber 24 (see FIG. 5). The separation member 50 preferably has an unrecessed opening 102 coaxial with each filter element 90 and into which the top portion of such filter element is partially telescoped. The filter elements 90 are secured within the openings 102 by known means such as welding. A weld bead can be applied circumferentially around the top of each filter element 90 within each corresponding opening 102, thereby securing and sealing each filter element within the opening 102. Thus, process liquid is received through inlet 26 which filters through the perforate filter elements 90 to remove impurities therefrom. The filtered liquid moves through the filter elements 90 through openings 102 into the outlet chamber 24. The filtered liquid is thereafter drawn through the outlet 28 for the desired application.

It should also be understood that rod 66 secures to separation member 50 generally equidistant between the openings 102 of the separation member as shown in FIG. 5. The rod elevates vibrator 16 above the openings 102 to insure that the flow of the process liquid through the openings is not impeded. For larger vibrating filters, the radial distance between filter elements 90, and thus between the openings 102, is sufficient to allow the vibrator to be mounted directly to the separation member without impeding liquid flow through the openings. For such larger vibrators, rod 66 is unnecessary and can be eliminated.

The separation member 50 further comprises a seal for preventing unfiltered liquid from undesirably leaking from the filter chamber 22 to the outlet chamber 24 around the perimeter of the separation member at the abutment of the outer edge of the separation member to the inner wall 20 of the housing 12. The separation member 50 comprises a groove 104 for receiving an O-ring 106. The pressure differential between the filter chamber 22 and the outlet chamber 24 causes the O-ring to be forced against the abutment of the separation member 50 to the inner wall 20 of the housing 12. This sealing arrangement has been found to be more effective than prior sealing arrangements which do not utilize the pressure differential between the filter chamber and the outlet chamber to form an airtight seal between the two chambers.

From the foregoing, it should be apparent that the cover 14, springs 52, separation member 50, and filter 18 are secured together to form one integral filtration unit. When the pivot toggles 32 are loosened and pivoted from the cover 14, the user can grasp the handle 14 to remove the entire filtration unit, thus leaving an empty housing 12. Therefore, the filtration unit can readily be worked on to repair any problems, or some or all of the filtration unit can be replaced if worn or unrepairably defective. For instance, if the filter 18 becomes worn, the filter can readily be removed from the filtration unit and replaced by removing the lower nuts 62. Similarly, if the O-ring 106 becomes worn, thereby rendering the seal ineffective, it can likewise be readily replaced by removing the filtration unit without the need for disassembling the entire vibrating filter.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vibrating filter comprising:
   a housing defining an outlet chamber and a filter chamber;
   a separation chamber secured within the housing to separate the outlet chamber and the filter chamber, the separation member having at least one hole for receiving filtered liquid;
   a filter secured within the filter chamber to the separation member, the filter having an outlet in fluid communication with the outlet chamber;
   a vibrator; and
   a rigid rod fixedly secured to said separation member at a proximal end and to said vibrator at a distal end, said vibrator coupled solely with said separation member and imparting generally horizontal vibration to said separation member through said rod to thereby directly vibrate only said filter.

2. The vibrating filter of claim 1 wherein the cross section of the housing is generally circular and wherein the separation member is a plate secured concentrically within the housing so that the filter chamber and the outlet chamber are generally cylindrical.

3. The vibrating filter of claim 2 wherein the proximal end of the rod is formed integrally with the separation plate generally at the center of the plate.

4. The vibrating filter of claim 1 further comprising a cover for the outlet chamber and vibration isolating means secured between the separation member and the cover for dampening vibration to the cover which is imparted to the separation member by the vibrator, the vibration isolating means allowing generally horizontal vibration of the separation member.

5. The vibrating filter of claim 4 wherein the vibration isolation means comprises at least one spring secured between the separation member and the cover.

6. The vibrating filter of claim 5 wherein the vibration isolation means comprises three at least substantially compressed, semirigid springs, each spring securing between separation member and the cover.

7. A vibrating filter comprising:
housing having an inside wall defining an open top;
filtration unit secured within the housing for filtering liquid entering through an inlet, the filtration unit comprising:
a cover for covering and sealing the open top of the housing, the cover having means for removably securing it to the housing:
a separation member coupled with the cover in spaced apart relation such that the housing is separated into an outlet chamber formed between the cover and the separation member, and a filter chamber formed below the separation member when the cover is secured to the housing, the separation member being supported by the cover within the housing so that the separation member abuts the inside wall of the housing, the separation member further having a bottom surface exposed to the filter chamber;
a sealing means secured adjacent the bottom surface of the separation member for sealing the abutment of the separation member to the inside wall of the housing;
a filter secured to the separation member within the filter chamber, the filter being in fluid communication with the outlet chamber;
a vibrator; and
a rigid rod fixedly secured to said separation member at one end and to said vibrator at the opposite end, said vibrator rigidly secured only to said separation member and disposed within the outlet chamber, the vibrator directly vibrating only the filter in a generally horizontal direction through said rod.

8. The vibrating filter of claim 7 wherein the sealing means comprises an O-ring secured adjacent to the bottom surface of the separation member against the abutment of the separation member to the inside wall of the housing.

9. The vibrating filter of claim 8 wherein the separation member further comprises a groove adjacent the bottom surface of the separation member for securing the O-ring therein.

10. The vibrating filter of claim 7 further comprising vibration isolating means secured between the separation member and the cover for dampening vibration to the cover which is imparted to the separation member by the vibrator and for allowing generally horizontal vibration of the separating member.

11. The vibrating filter of claim 10 wherein the vibration isolation means comprises at least one spring secured between the separation member and the cover.

12. The vibrating filter of claim 11 wherein the vibration isolation means comprises three at least substantially compressed, semirigid springs, each spring securing between separation member and the cover.

13. A vibrating filter comprising:
housing defining an outlet chamber and a filter chamber;
a separation member secured within the housing to separate the outlet chamber and the filter chamber;
a cover for the outlet chamber, the cover having means for securing it to the housing;
a filter secured within the filter chamber to the separation member, the filter being in fluid communication with the outlet chamber;
a vibrator
a rigid rod fixedly secured to said separation member at one end and to said vibrator at the opposite end, said vibrator coupled solely with said separation member and imparting generally horizontal vibration to said separation member through said rod to thereby directly vibrate only said filter; and
vibration isolating means secured between the cover and the separation member for dampening vibration to the cover which is imparted the separation member by the vibrator, the vibration isolating means allowing generally horizontal vibration of the separation member.

14. The vibrating filter of claim 13 wherein the vibration isolation means comprises at least two springs.

15. The vibrating filter of claim 14 wherein the vibration isolation means comprises at least three substantially compressed, semirigid springs secured equidistantly.

* * * * *